United States Patent
Swett

(10) Patent No.: US 9,437,184 B1
(45) Date of Patent: Sep. 6, 2016

(54) ELEMENTAL ARTIFICIAL CELL FOR ACOUSTIC LENS

(71) Applicant: BAKER HUGHES INCORPORATED, Houston, TX (US)

(72) Inventor: Dwight W. Swett, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/727,412

(22) Filed: Jun. 1, 2015

(51) Int. Cl.
*G10K 11/30* (2006.01)

(52) U.S. Cl.
CPC .................................... *G10K 11/30* (2013.01)

(58) Field of Classification Search
CPC ...................................................... G10K 11/30
USPC ................... 181/175, 176; 367/150
See application file for complete search history.

(56) References Cited

U.S. PATENT DOCUMENTS

| | | | |
|---|---|---|---|
| 2,541,946 A * | 2/1951 | Stark | H04R 1/345 181/176 |
| 3,329,235 A * | 7/1967 | Shaper | H04R 1/26 181/147 |
| 3,557,901 A * | 1/1971 | Young | H04R 1/345 181/176 |
| 3,957,134 A * | 5/1976 | Daniel | G10K 11/30 181/176 |
| 4,332,018 A * | 5/1982 | Sternberg | G10K 11/30 367/103 |
| 4,888,861 A * | 12/1989 | Day | B06B 1/0625 29/25.35 |
| 5,345,045 A * | 9/1994 | Rohwedder | G10K 11/30 181/176 |
| 8,616,329 B1 * | 12/2013 | Welter | G10K 11/30 181/167 |
| 9,105,791 B1 * | 8/2015 | Dyer | H01L 31/1127 |
| 2014/0126322 A1 * | 5/2014 | Cipolla | G10K 11/18 367/1 |

* cited by examiner

*Primary Examiner* — Jeremy Luks

(74) *Attorney, Agent, or Firm* — Mossman, Kumar & Tyler, PC

(57) ABSTRACT

A cell for manipulating an acoustic wave includes a plurality of spokes radiating from a hub and a plurality of concentrically arranged leaves. Each leaf is supported by at least one spoke and is formed by a plurality of circumferentially distributed fingers. Each finger is connected to at least one spoke.

19 Claims, 5 Drawing Sheets

ELEMENTAL ARTIFICIAL CELL FOR ACOUSTIC LENS

FIELD OF THE DISCLOSURE

This disclosure relates to acoustic sensors and methods of making and using such acoustic sensors in various tools, including acoustic logging tools.

BACKGROUND OF THE DISCLOSURE

Downhole acoustic logging tools, which are used to investigate subsurface features, can include one or more acoustic transmitters or sources and a number of acoustic receivers. These tools may also include a transceiver that can function as a transmitter and a receiver. In either case, the transmitters emit acoustic energy into the subsurface environment surrounding the wellbore. The acoustic signals are reflected by interfaces associated with the wellbore, well structures, and/or the formation. The reflected acoustic signals are detected by the receivers in the logging tool and processed to provide estimates of one or more properties of the wellbore, well structures, and/or the formation. The present disclosure provides acoustic and vibration sensors that utilize a lens to manipulate such acoustic waves.

SUMMARY OF THE DISCLOSURE

In aspects, the present disclosure provides a cell for manipulating an acoustic wave. The cell may include a plurality of spokes radiating from a hub. Each spoke may have a plurality of junctures and a plurality of fingers may be circumferentially distributed around the hub. At least one finger is connected at each juncture.

In still further aspects, the present disclosure provides an acoustic tool. The acoustic tool may include a transducer configured to generate and detect an acoustic wave and a lens. The lens may be spaced-apart from the acoustic source. The lens may have a planar surface bounded by a plurality of edges. The acoustic wave enters the lens via at least one the edges and travels along an axis that is parallel to the planar surface. The lens may include at least one lens element having a plurality of spokes radiating from a hub. Each spoke may include a plurality of fingers that are circumferentially distributed around the hub. The hub and the plurality of spokes may be planar members arranged parallel to the planar surface.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The characteristics of metamaterials derive from the basic dynamic mechanism of resonances, occurring in aggregate, to affect the creation of material properties beyond the bounds of Nature. In the particular case of acoustic metamaterials, these characteristics begin directly from the frequency response behavior of the two basic material parameters: effective mass density and effective bulk modulus. Both of these material parameters can take on negative attributes and even anisotropic behavior in the presence of particular types of resonance transition zones, specifically within proximity of anti-resonances. These anisotropic and negative properties can give rise to a wide range of spectral features within certain frequency bands, including negative refraction and hyperlensing, which can open possibilities for beam focusing and amplification in flat lenses. Actions such as focusing and amplification will be generally referred to as manipulating an acoustic wave.

Negative index properties arising from unit cell resonance within the frequency band may occur over a very narrow spectral bandwidth, the range of which is an effect of the resonance characteristics of the unit cell and the properties of the matrix and/or background fluid. In order to affect these negative properties over a broader frequency range, a multitude of compatible resonances in the elemental cell must couple constructively. This can be achieved through the metamaterial unit cell designs of the present disclosure.

There are several factors determining whether a particular unit cell design can affect the dispersion characteristics of a propagating wave to the extent of exhibiting anisotropic and negative index properties behavior necessary for hyperlensing. One particularly relevant factor is the creation of an aggregate of resonances in the transmission coefficient spectra that will couple to form a wide band of wave manipulation in the frequency range of interest. Whether the frequency band formed from the aggregate will give rise to anisotropic and negative index responses is a function of other properties of the resonance couplings. The extent to which a unit cell design exhibits significant acoustic impedance mismatch, absorption loss, and/or significant magnitude of bulk modulus are dominant influences, since any one of these can negate the hyperlensing effect in the frequency band. Cells according to the present disclosure may be referred to as elemental components in the superlens or hyperlens, depending on their characteristics.

Figure 1:
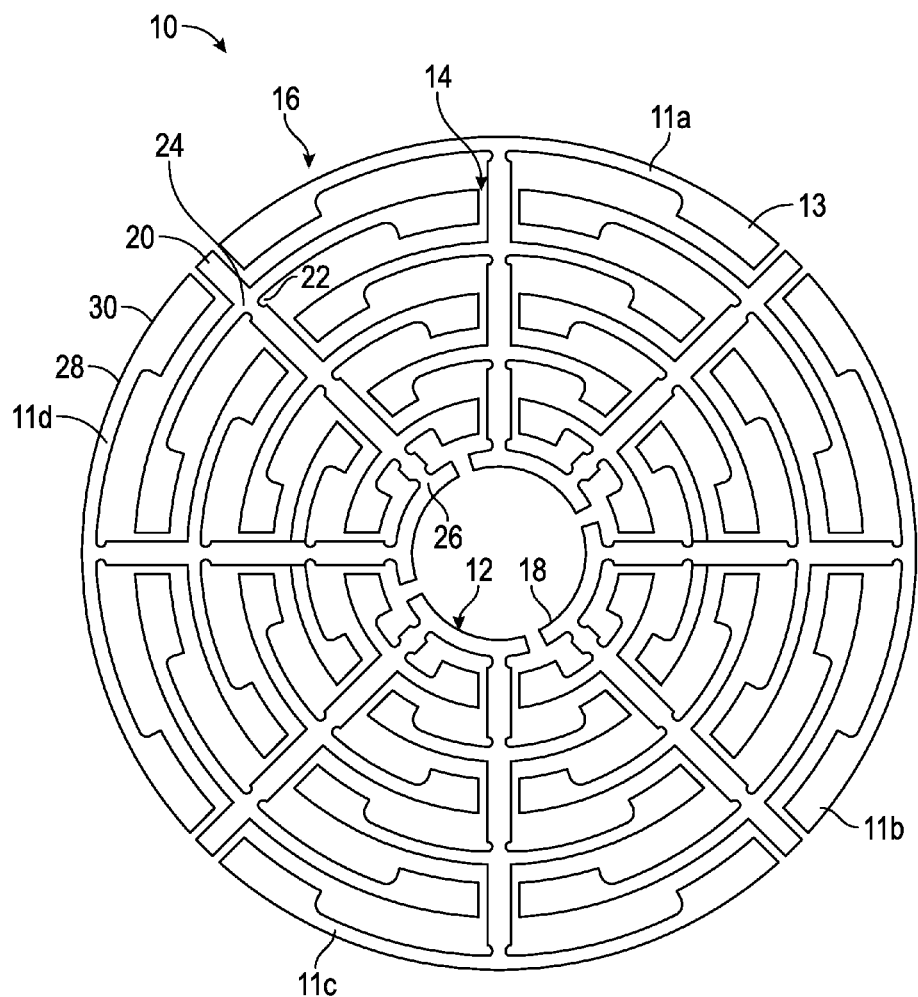
FIG. 1 is a schematic diagram of an exemplary circular cell according to embodiments of the disclosure.

Referring to FIG. 1, there is shown an exemplary metamaterial cell 10 for manipulating an acoustic wave in accordance with the present disclosure. Generally speaking, the cell 10 is a platen and disc like member. The cell 10 has two opposing planar surfaces that are parallel. As illustrated, the visible planar surface 13 is parallel with the paper. The distance between the two surfaces, or thickness, may be in the range of 25 micron to 1 millimeter. The diameter of a circle enclosing the cell 10 may be in the range of 800 micron to 5 millimeter. These dimensions are generally selected to allow phenomena such as resonances to have a measurable influence on the behavior of the cell 10 and affect wave manipulation in the particular frequency ranges of interest. The cells, such as cell 10, of the present disclosure may be formed of metals or non-metals. Suitable metals include, but are not limited to, platinum, tungsten, gold, and exotic options such as iridium, with the important material property for acoustic wave manipulation being the mass density of the metal.

One non-limiting embodiment of a cell 10 may include a hub 12, a plurality of spokes 14 radiating from the hub 12, and a plurality of concentrically arranged leaves 16.

The hub 12 acts as a central support structure for the spokes 14. In the embodiment shown, the hub 12 is formed of four separate segments, an illustrative segment being labeled with numeral 18. The hub 12 may be circular or have any other suitable geometric shape. Also, while four segments 18 are shown, the hub 12 may be formed as a single integral body or have two or more segments 18. Each segment 18 is physically connected to one or more spokes 14.

The spokes 14 provide the structure for supporting the leaves 16. An illustrative spoke is labeled with numeral 20. The spoke 20 may be formed as an elongated bar having one or more necks 22. A neck 22 is a section of the spoke 20 that has a cross-sectional area that is smaller than the immediately adjacent cross-sectional areas. Thus, the spoke 20 is more flexible at the necks 22 and can bend, twist, or otherwise deform more easily at the necks 22 than at other locations along the spoke 20. In one arrangement, the necks 22 are formed immediately adjacent to and radially inward of each juncture 24 between the spoke 20 and the leaf 16. Also, a neck 22 may be immediately radially outward of a juncture 26 between the spoke 20 and the hub 12.

Each of the leaves 16 may include a circumferentially distributed array of fingers 28 arranged in the form of a circle. Each finger 28 is cantilevered from the juncture 24. While two fingers 28 are shown at each juncture 24 with an orientation transverse to the spoke 20, greater or fewer fingers 28 and different orientations may be used. The finger 28 may be a curved member that includes one or more enlarged sections 30. An enlarged section 30 has more mass than an immediately adjacent section of the finger 28. The increased mass is formed by providing the enlarged section 30 with a larger width than other sections of the finger 28. Thus, there may be an asymmetric mass distribution along the length of the finger 28. To interleave the fingers 28, the radial positions of the finger 28 are staggered for each successive spoke 14. Thus, a finger 28 of one spoke 14 may nest radially between two fingers 28 of an adjacent spoke 14. While six leaves 16 are shown, greater or fewer leaves 16 may be used.

The cell 10 of FIG. 1 has four segments 11a-d. Each segment 11a-d has two spokes 14 radiating from a hub segment 18. Each spoke 14 has three sets of fingers 28. Each set has two fingers 28. The fingers 28 are circumferentially distributed to form six leaves 14. It should be noted that the four segments 11a-d are structurally independent with one another. While the elements making up each of the segments 11a-d have been described separately, it should be understood that each segment 11a-d may be manufactured as a unitary body as opposed to being assembled from discrete components. It should also be noted that while four segments are depicted, the cell 10 may use fewer or greater number of segments.

The resonances and anti-resonances within the cell 10 are affected by the interaction of the various structural features through the matrix or background fluid medium described above. Thus, the number, size, shape, and orientation of features such as the spokes 14, leaves 16, fingers 28, and enlarged sections 30 influence where and to what extent resonances and anti-resonances occur and how they complement or negate one another in affecting manipulation and control of the incident acoustic wave.

Figure 2:
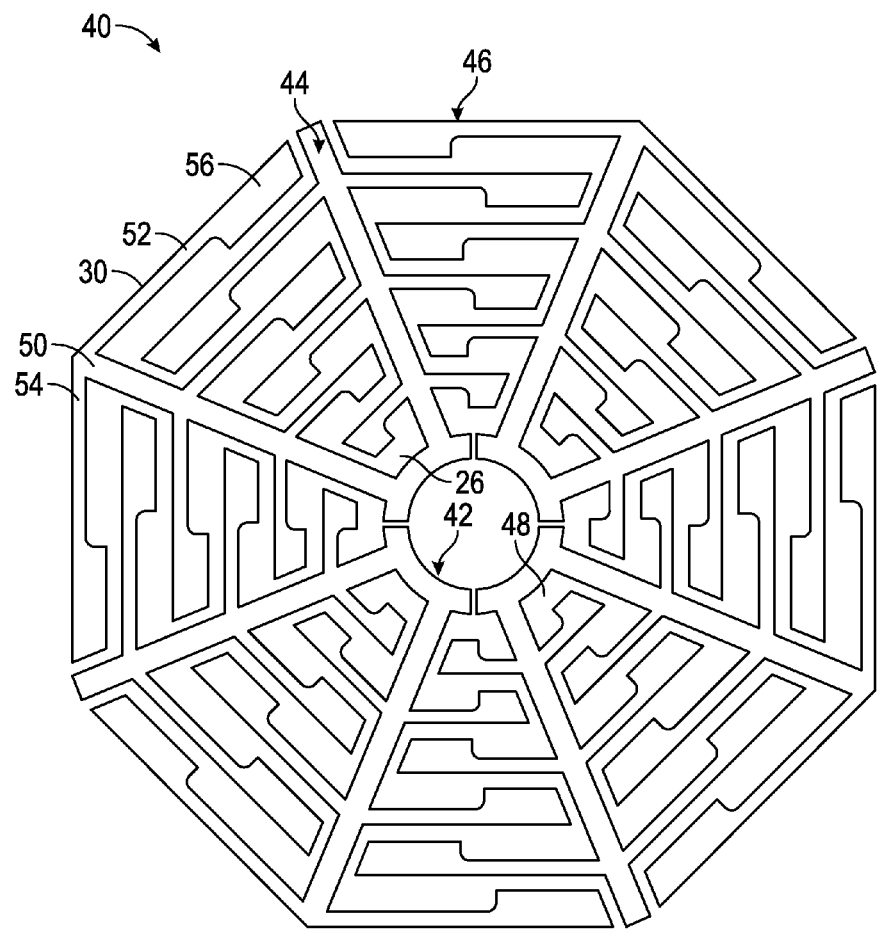
FIG. 2 is a schematic diagram of an exemplary octagonal cell according to embodiments of the disclosure.

Referring to FIG. 2, there is shown another embodiment of a cell 40 for manipulating an acoustic wave. The general shape and dimensions of the cell 40 is similar to those of cell 10 (FIG. 1). The cell 40 may include a hub 42, a plurality of spokes 44 radiating from the hub 42, and a plurality of concentrically arranged leaves 46. The cell 40 is similar to the cell 10 of FIG. 1 in many aspects. The variations of the cell 40 are discussed below.

As before, the spokes 44 provide the structure for supporting the leaves 46. An illustrative spoke is labeled with numeral 50. In this embodiment, the spoke 50 may be formed as an elongated bar that does not include any reduced cross-sectional areas. Also, the leaves 46 may include a circumferentially distributed array of fingers 52, with each finger 52 being cantilevered from a juncture 54. In this arrangement, the fingers 52 are straight members that include one or more enlarged sections 56.

In FIG. 2, the leaves 46 are arranged as a plurality of concentric polygons. In the illustrated arrangement, the each of the leaves 46 has an octagon shape. However, other polygon shapes may be used. As before, the fingers 52 are interleaved by staggering the radial positions of the fingers 52 for each successive spoke 44. The cell 40 of FIG. 2 has four segments configured in the same manner as the cell 10 of FIG. 1. However, any number of segments may be used.

Figure 3:
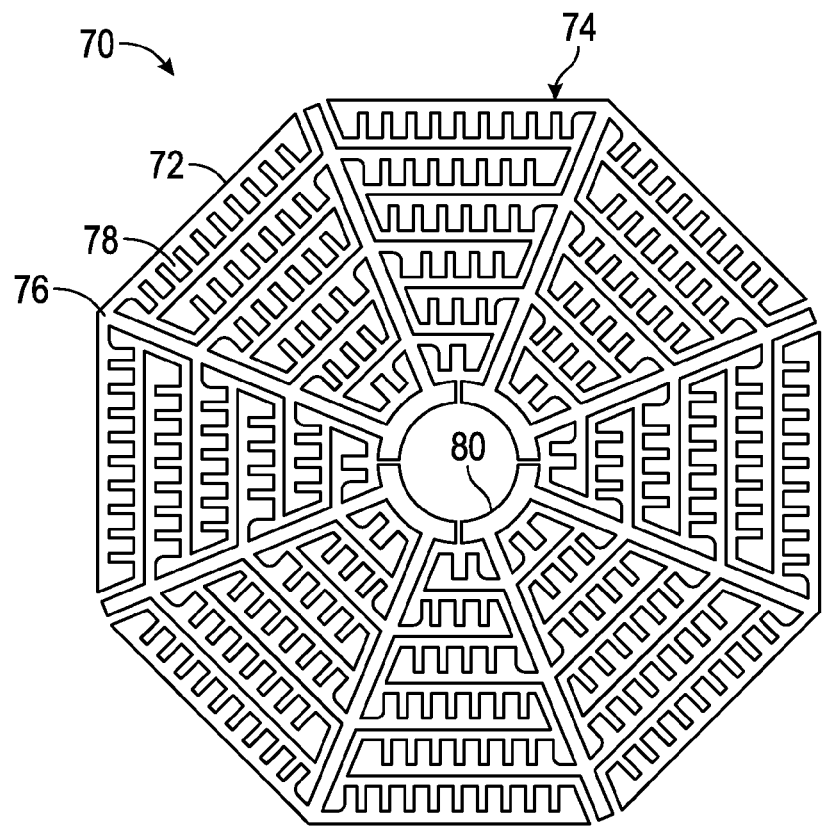
FIG. 3 is a schematic diagram of an exemplary cell according to embodiments of the disclosure that uses fingers with projections.

Referring to FIG. 3, there is shown another embodiment of a cell 70 for manipulating an acoustic wave. In a manner previously discussed, the fingers 72 of each leaf 74 are cantilevered from a spoke 74. In this embodiment, the fingers 72 have projections 78 that are oriented transverse to the fingers 72. Each of the projections 78 may be tab or bar like elements that can move independently relative to one another. By moving, it is meant bending, twisting, vibration, etc. While the projections 78 are shown projecting radially inward to a hub 80, it should be appreciated that the fingers 72 may be arranged to have the projections 78 project radially outward, or both.

The shape, size, number, and orientation of the projections 78 within each leaf 76 and between the leaves 76 may be varied in order to influence the resonant behavior of the cell 70. Thus, for instance, the projections 78 may be of different sizes along a finger 72 and each of the fingers 72 may have a different number of projections 78.

Further, the cells according to the present disclosure need not be symmetric or quasi-isotropic as shown in FIGS. 1-3.

Certain embodiment of the present disclosure may incorporate anisotropy in the shape factor to influence the bandwidth and hyperlensing effect of negative index resonant bandwidths formed by a cell. In one methodology, conformal mapping anisotropy may be applied by invoking geometry shaping transformations that maintain the invariance of the Helmholtz wave equation; e.g., a Joukowsky conformal mapping transformation. For instance, the transformation may be described by the relation:

$$\xi = Z + \frac{b^2}{Z}$$

with the original cell coordinates:

$$Z = x + iy$$

and the transformed (shaped) cell coordinates:

$$\xi = u + iv$$

A Joukowsky conformal mapping may transform the FIG. 2 octagonal cell boundary that can be circumscribed by a circle of radius R into a shaped cell geometry that can be circumscribed by the ellipse with shaping factor S=a/b where a and b are the elliptical dimensions collinear with the x and y axes, respectively. All remaining coordinates in the original interleaf cell geometry transform according to the same shaping factor S. Therefore, the Joukowsky transformation for an octagonal interleaf cell is:

$$[u + iv] = x\left[\frac{2S}{S+1}\right] + iy\left[\frac{2}{S+1}\right]$$

Figure 4:
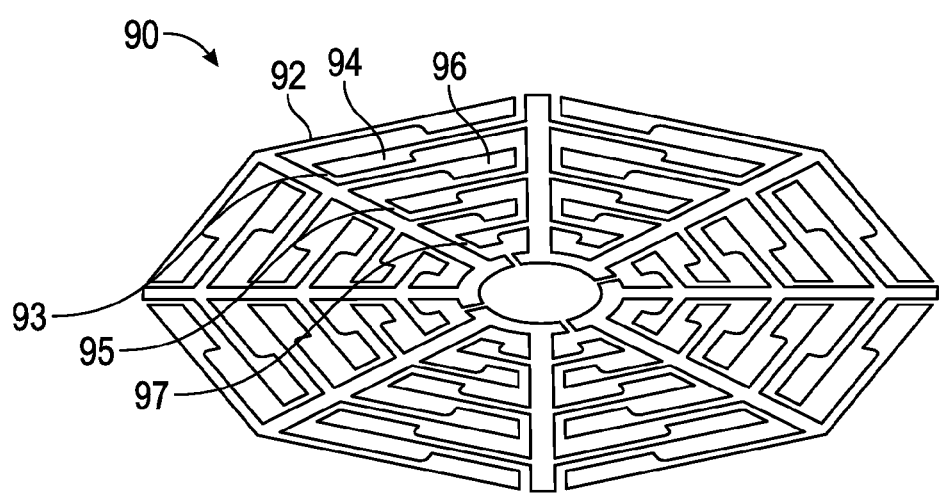
FIG. 4 is a schematic diagram of an exemplary octagonal cell resulting after a conformal mapping of the FIG. 2 embodiment.

These equations may be used to transform the 2D geometrical [x,y] coordinates of the cross-section for the quasi-isotropic cell illustrated previously in FIG. 2 with a conformal Joukowsky transformation with shape factor S=2 anisotropy in the cell shape. The resulting anisotropic cell 90 is shown in FIG. 4. The S=2 anisotropy is merely one illustrative value. One feature of the conformal mapping is that a thickness of at least two fingers varies non-linearly along the plane on which a cell lies. For example, the thickness of fingers, 92, 94, and 96 are different and the difference is mathematically non-linear. The comparison of thickness may be done by selecting the same feature (e.g., an enlarged section) and measuring a distance along the same location along the same axis. For instance, the edges 93, 95, and 97 may be used as a measure of the thickness of the transformed sections of the fingers. A conformal mapping may also be applied to the cells of FIGS. 1 and 3 or other cell configurations according to the present disclosure.

Figure 5:
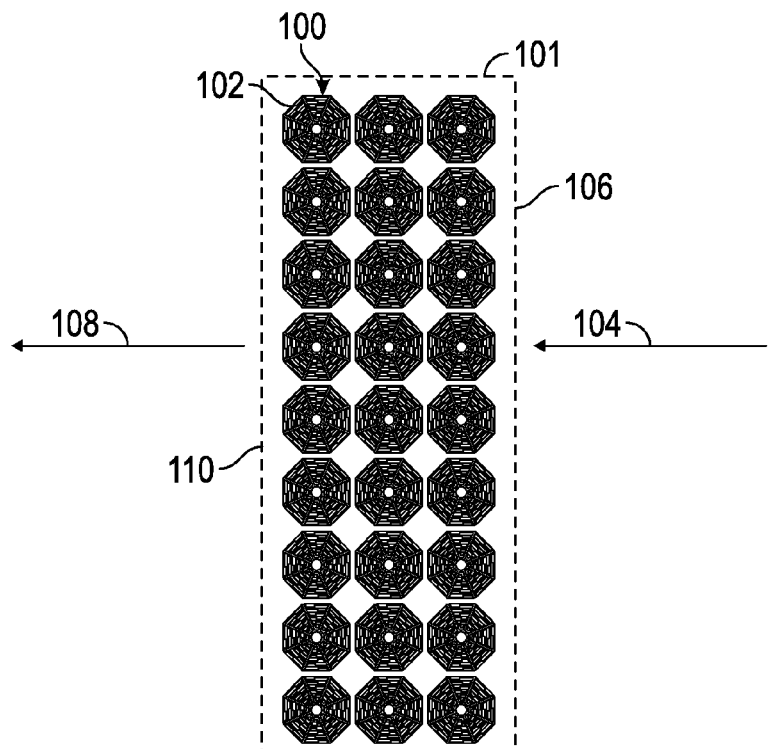
FIG. 5 illustrates a lens that includes cells made in accordance with embodiments of the present disclosure.

Referring to FIG. 5, there is shown a lens 100 having a plurality of cells 102. While the cells 102 are depicted as the same shape of the cells of FIG. 2, the lens 100 may include any cell configuration according to the present disclosure. The cells 102 are arranged edge-to-edge and have planar surfaces aligned co-planar with one another; e.g., each has a planar surface parallel with the paper. An acoustic wave 104 enters the lens 100 principally through an edge 106. The acoustic wave 104 travels through the lens 100 in a direction that is parallel with the plane along which all of the cells 102 lie. The cells 102 of the lens 100 manipulate the acoustic wave 104 such that a manipulated wave 108 exits from an edge 110 of the lens 100. In one non-limiting embodiment, a substrate 101 may be used as a support from which each of the cells 102 project. For example, the cells 102 may be grown from the substrate 101 such that the cells 102 and substrate 101 are integral. For instance, the substrate 101 may be a wafer or a plate. The cells 102 and the structurally independent features making up each cell 102 may project from the substrate 101 in a cantilever fashion.

Figure 6:
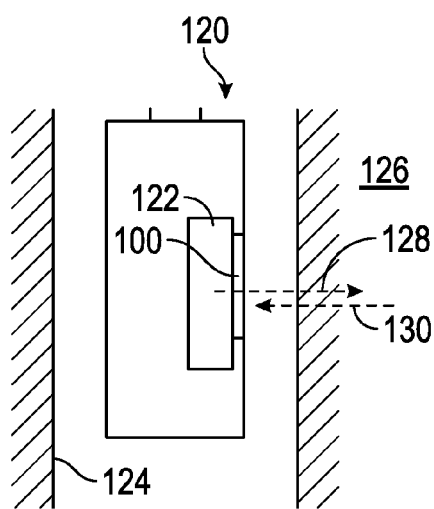
FIG. 6 illustrates an acoustic tool using cells made in accordance with the present disclosure and disposed in a borehole intersecting an earth formation.

Referring to FIG. 6, there is shown one embodiment of an acoustic tool 120 according to the present disclosure. The tool 120 includes a transducer 122 and a lens 100. The tool 120 may be conveyed by a suitable conveyance device (not shown) along a borehole 124 drilled in an earthen formation 126. The conveyance device may be a non-rigid carrier such as a wireline, e-line, slick-line, or coiled tubing, a rigid carrier such as drill pipe, a drop tool, or an autonomous device. In one mode of operation, the transducer 122 generates an acoustic wave 128 that is manipulated by the lens 100 and directed toward the formation 126. A reflected wave 130 returns from the formation and enters the lens 100. After being manipulated by the lens 100, the wave 120 enters the transducer 122 and is processed. In another mode of operation, the tool 120 operates in a passive state and receives acoustic signals created by one or more external sources.

Figure 7:
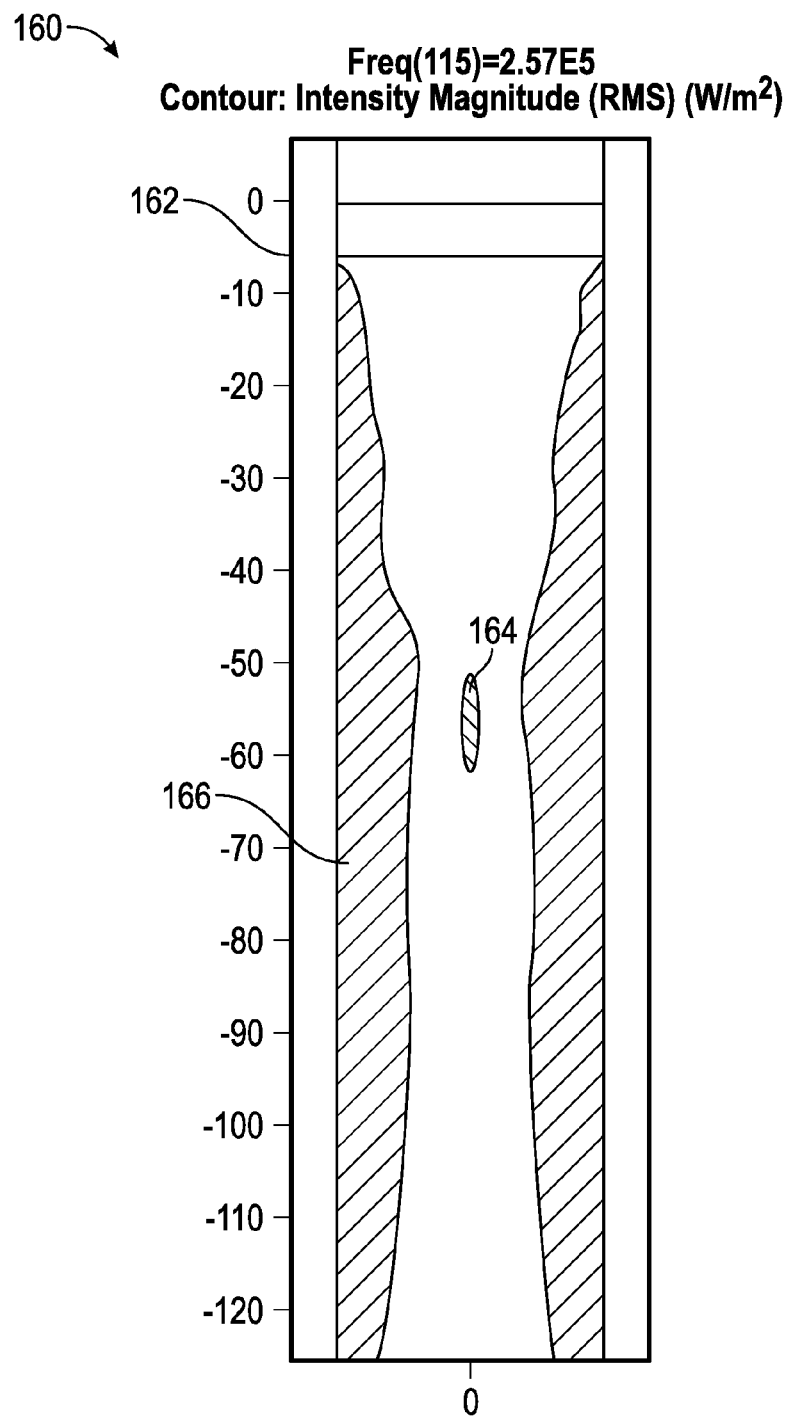
FIG. 7 is a plot of a simulation of anacoustic field intensity for the FIG. 3 embodiment with a FIG. 4 conformal mapping.

Referring now to FIG. 7, there is shown a plot 160 of an acoustic intensity field that is output from an octagon-shaped metamaterial hyperlens as shown in FIG. 3 with a conformal mapping transformation as shown in FIG. 4. The acoustic field is due to an incident plane acoustic wave (propagating from the top) oscillating at 257 kHz. The left vertical axis 162 is a distance from an output surface of the hyperlens. This simulation demonstrates that an acoustic field focus 164 occurs at approximately 55 mm from the output surface of the hyperlens with about twenty two percent amplification. The region identified with numeral 166 is a portion of the field with relatively lower intensity.

While the present disclosure is discussed in the context of a hydrocarbon producing well, it should be understood that the present disclosure may be used in any borehole environment (e.g., a water or geothermal well). Also, embodiments may be used in acoustic tools used at the surface or in bodies of water.

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. A cell for manipulating and directing an acoustic wave, comprising:
   a hub;
   a plurality of spokes radiating from the hub, wherein each spoke has a plurality of junctures; and
   a plurality of fingers circumferentially distributed around the hub, wherein and at least one finger of the plurality of fingers is connected at each juncture, wherein the plurality of fingers have a planar surface bounded by a plurality of edges, the plurality of fingers being oriented to cause the acoustic wave to enter the plurality of fingers via at least one of the plurality of edges and travel along an axis that is parallel to the planar surface, wherein the hub is formed of a plurality of structurally independent sections, wherein each section has a set of the plurality of spokes, and wherein each set of the plurality of spokes are structurally independent to one another.

2. The cell of claim 1, wherein the plurality of fingers are further distributed to form a plurality of concentric leaves.

3. The cell of claim 2, wherein each spoke includes a plurality of necked portions, each necked portion being immediately adjacent to each juncture.

4. The cell of claim 2, wherein the leaves are shaped as one of: (i) a circle, and (ii) a polygon.

5. The cell of claim 1, wherein each of the plurality of fingers includes an enlarged portion.

6. The cell of claim 1, wherein the hub and the plurality of spokes are aligned along a plane.

7. The cell of claim 1, wherein a thickness of at least two fingers of the plurality of fingers varies non-linearly along the plane.

8. The cell of claim 1, wherein a plurality of pairs of fingers branch in opposing directions along each spoke.

9. The cell of claim 1, wherein an enlarged portion is formed at a distal end of each finger of the plurality of fingers.

10. The cell of claim 1, wherein each finger includes at least one radially oriented projection.

11. The cell of claim 1, wherein:
the hub, the plurality of spokes, and the plurality of fingers are divided to form a plurality of structurally independent cell segments;
the plurality of fingers are radially staggered to nest between one another; and
the hub, the plurality of spokes, and the plurality of fingers all lie along the same plane.

12. An acoustic tool, comprising:
a transducer configured to generate and detect an acoustic wave;
a lens spaced-apart from the acoustic source; the lens having a planar surface bounded by a plurality of edges, wherein the acoustic wave enters the lens via at least one of the plurality of edges and travels along a axis that is parallel to the planar surface; the lens including at least one lens element having:
a hub;
a plurality of spokes radiating from the hub, wherein each spoke includes a plurality of fingers, the plurality of fingers being circumferentially distributed around the hub,
wherein the hub and the plurality of spokes are planar members arranged parallel to the planar surface.

13. The tool of claim 12, wherein the lens includes a plurality of co-planar lens elements.

14. A method for manipulating an acoustic wave, comprising:
positioning a lens to receive the acoustic wave, the lens including:
a hub;
a plurality of spokes radiating from the hub, wherein each spoke has a plurality of junctures; and
a plurality of fingers circumferentially distributed around the hub, wherein and at least one finger of the plurality of fingers is connected at each juncture, wherein the plurality of fingers have a planar surface bounded by a plurality of edges, the plurality of fingers being oriented to cause the acoustic wave to enter the plurality of fingers via at least one of the plurality of edges and travel along an axis that is parallel to the planar surface;
positioning a transducer to generate the acoustical wave principally into a first edge of the lens;
receiving the acoustic wave principally into the first edge of the lens;
conveying the acoustic wave through the lens in a direction parallel to a face of the lens; and
directing the acoustic wave from a second edge of the lens that is on a side opposite to the lens.

15. The method of claim 14, further comprising receiving a second acoustic signal at the transducer from the cell principally in a direction parallel to the planar surface of the plurality of fingers.

16. The method of claim 14, wherein the hub is formed of a plurality of structurally independent sections, wherein each section has a set of the plurality of spokes, and wherein each set of the plurality of spokes are structurally independent to one another.

17. The method of claim 14, wherein the hub and the plurality of spokes are aligned along a plane and wherein a thickness of at least two fingers of the plurality of fingers varies non-linearly along the plane.

18. An acoustic tool, comprising:
a transducer configured to generate and detect an acoustic wave; and
a cell including:
a hub;
a plurality of spokes radiating from the hub, wherein each spoke has a plurality of junctures; and
a plurality of fingers circumferentially distributed around the hub, wherein and at least one finger of the plurality of fingers is connected at each juncture, wherein the plurality of fingers have a planar surface bounded by a plurality of edges, the plurality of fingers being oriented to cause the acoustic wave to enter the plurality of fingers via at least one of the plurality of edges and travel along an axis that is parallel to the planar surface,
wherein the transducer generates the acoustic signal to the cell principally in a direction parallel to the planar surface of the plurality of fingers.

19. The acoustic tool of claim 18, wherein the transducer receives the acoustic signal from the cell principally in a direction parallel to the planar surface of the plurality of fingers.

* * * * *